Dec. 25, 1934.   H. KALLMANN   1,985,415
SIGNALING SYSTEM
Filed Oct. 16, 1931   3 Sheets-Sheet 1

Inventor:
Heinz Kallmann
by R.C. Hopgood
Attorney

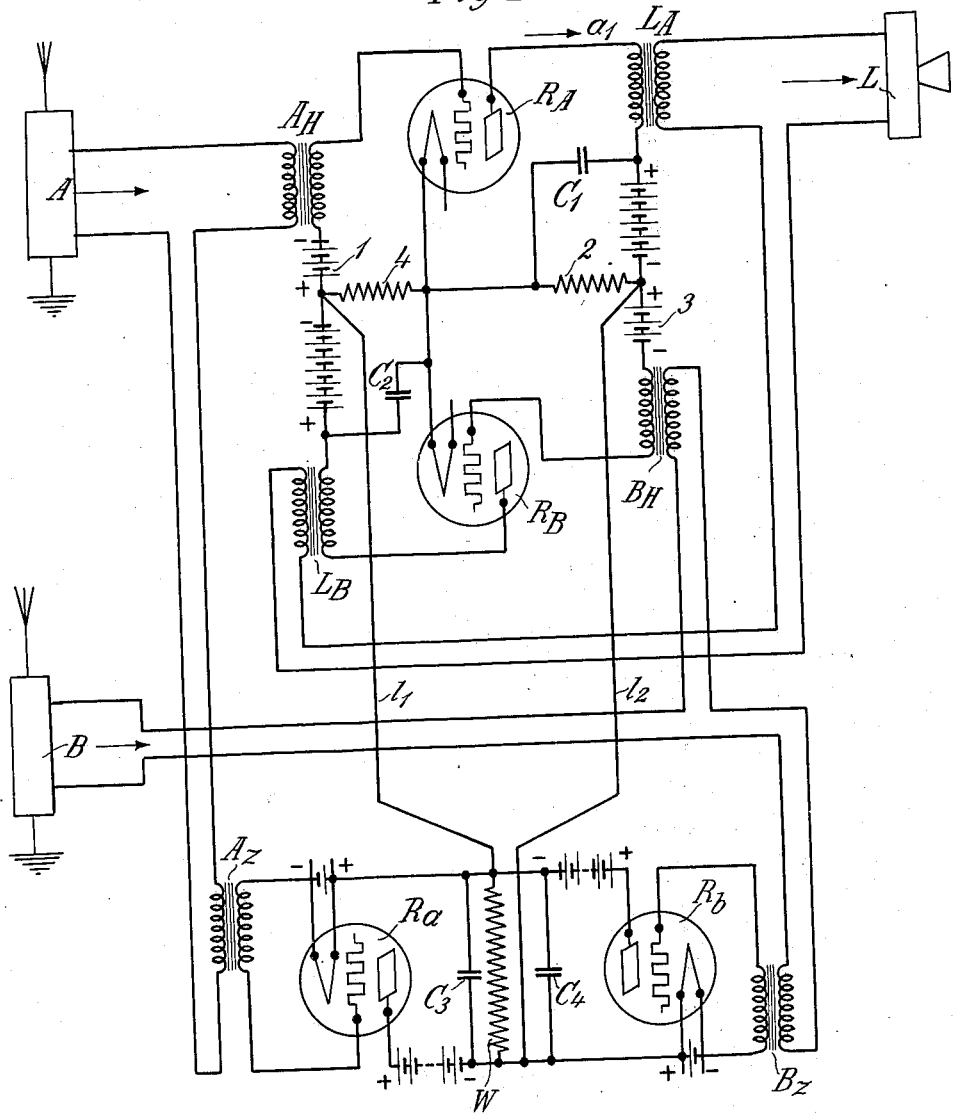

Dec. 25, 1934.   H. KALLMANN   1,985,415
SIGNALING SYSTEM
Filed Oct. 16, 1931   3 Sheets-Sheet 3

Inventor:
Heinz Kallmann
by R.C. Hopgood
Attorney

Patented Dec. 25, 1934

1,985,415

UNITED STATES PATENT OFFICE 1,985,415

SIGNALING SYSTEM

Heinz Kallmann, Berlin-Neutempelhof, Germany, assignor to C. Lorenz Aktiengesellschaft, Berlin-Tempelhof, Germany Application October 16, 1931, Serial No. 569,196
In Germany October 17, 1930

4 Claims. (Cl. 250—20)

In order to reduce the fading effects at signal receiving stations it has been proposed to erect receivers to operate under different conditions of reception. It is well known, for instance, that receivers may be stationed at two geographically spaced points, or may be tuned to receive signals on different wavelengths, and that their outputs may be connected with each other in order that they both may act conjointly on a common indicator of reception. This contrivance has been successful in overcoming fading because at two places sufficiently remote from one another fading does not occur simultaneously. But most of the aforesaid devices have overlooked the fact that at the different receiving stations high frequency energies of the same intensity are often present for reception. In such a case the receivers located at different places are transmitting high frequency energies of the same intensity to the common device. In this connection it may further occur that said high frequency energies are phase shifted 180° against each other. In such a case, therefore, a complete annulment of the received signals is caused in the common indicator since the signals arriving separately at the two receivers are of equal size but have an opposite effect.

These disadvantages are to be avoided by the arrangement according to the invention. Therefore, the receivers are not connected in such a manner that their output circuits are directly connected with each other, but care is taken by a special device, to which the output circuits are connected, that the circuit wherein the signals are received is always influenced by one receiver only, while the output circuit of the other receiver from which a smaller amount of energy is emanating is made ineffective. Furthermore, in the event of equal loudness, only one of the receivers operates the indicator of reception (telephone, writing device, picture receiver, or the like). To such end a selecting device is used, the circuit arrangement of which resembles the well-known kallirotron connection, but differs from it in that it operates under different working conditions and in conjunction with additional apparatus.

Figure 1:
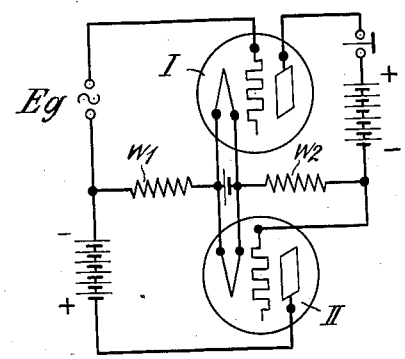

In order that the invention may be readily understood, the mode of action of the kallirotron will be briefly described, and may be readily comprehended by referring to Fig. 1, which is a diagrammatic representation of such an arrangement.

Representative examples of the novel device are diagrammatically illustrated by Figs. 2 to 5.

Fig. 2 shows the circuit arrangement of one embodiment of the invention.

Figure 3:
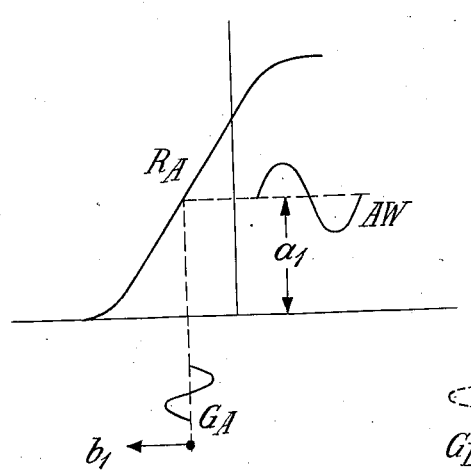
Figure 4:
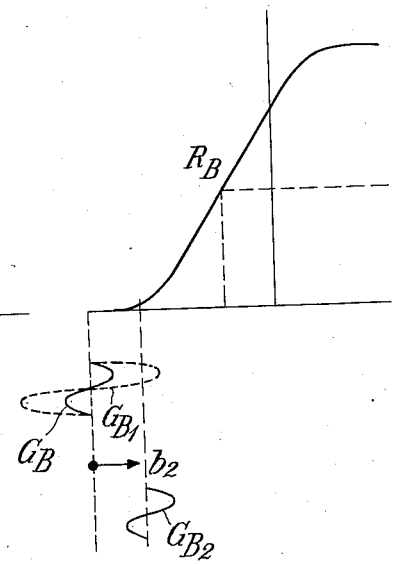

Figs. 3 and 4 refer to the mode of action of the arrangement represented by Fig. 2.

Figure 5:
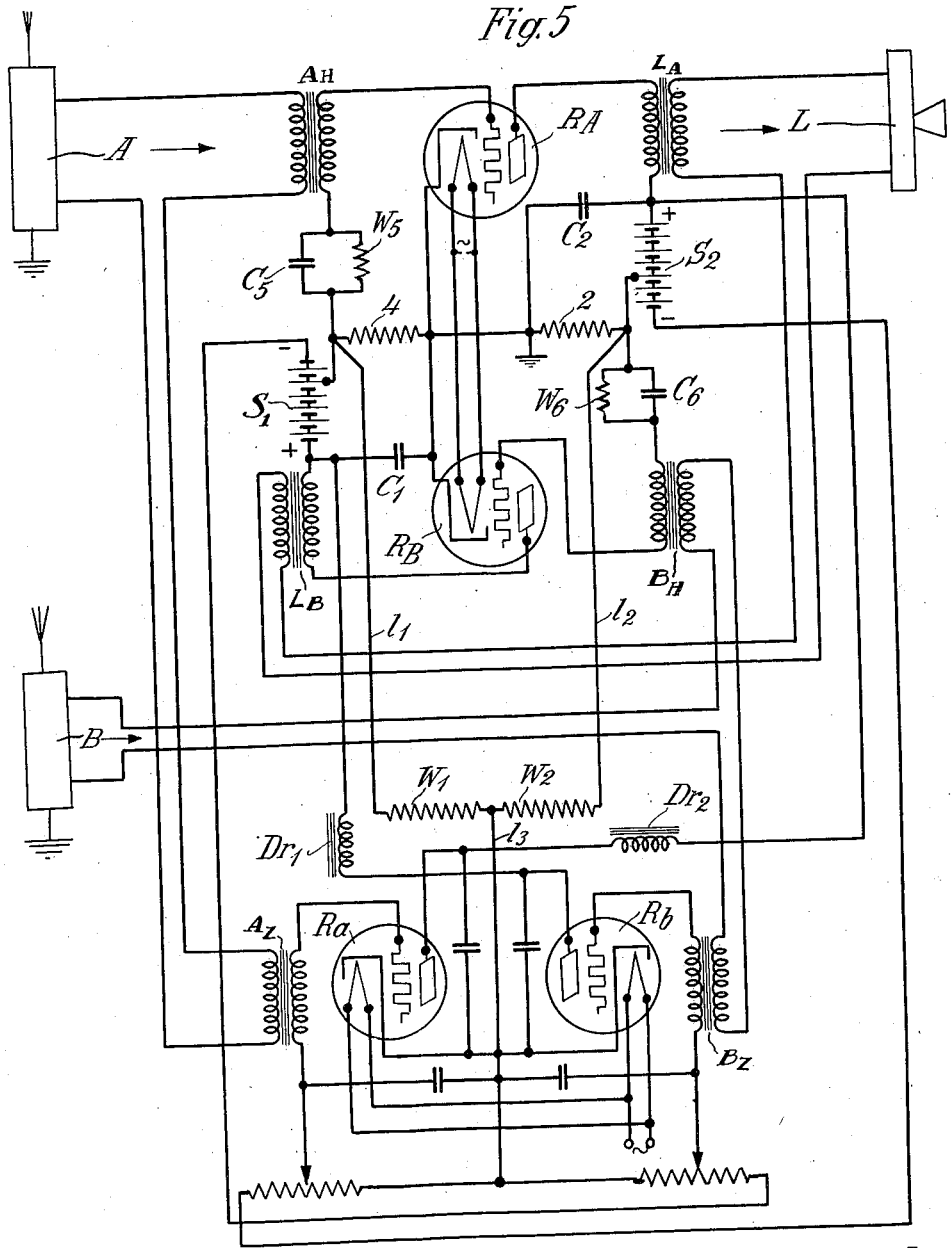

Fig. 5 illustrates another embodiment of the invention.

Reverting to Fig. 1, assuming that the two electron tubes I, II be operated by a current of the same intensity, and that an alternating potential $Eg$ be connected to the tube I, then the anode current of this tube will increase during the positive half-period of such potential so that the drop of potential at the resistance W2 is accordingly increased. A greater negative grid bias is thereby produced in tube II. The anode current thereof consequently falls off. The negative grid bias for tube I, produced by the drop through the resistance W1 by the normal anode current of tube II, is thus decreased. The grid potential of the tube I is in this way caused to approach its maximum in the positive direction. The anode current of tube I thereby increases still further. This, in turn, adds to the negative grid bias of tube II. If the circuit elements are dimensioned accordingly, this mode of operation continues until tube I reaches its maximum output of current, and tube II is put entirely out of action. During the negative half-period of the alternating grid potential $Eg$ the reverse operation takes place. Thus, there results an amplification of input which depends upon the dimensioning of the circuit elements, and which is very high but which simultaneously brings about considerable amplitude distortion. It is to be understood that it is difficult to so adjust the arrangement that with input energies of different intensities, anode currents of correspondingly different intensities shall flow. The above arrangement, on the contrary, tends to get unstable, that is, independently of the intensity of the input tension, one of the tubes does all the work while the other tube does not work at all.

This unstable condition is utilized in the following signaling system for the purpose above stated, the said distortion, however, being nevertheless avoided by the use of auxiliary apparatus.

In Fig. 2 the main tubes of the selecting device are denoted by RA and RB. There are also two auxiliary tubes $Ra$, $Rb$, the purpose of which will be explained below. The received energy is supplied from the receiver A to the tube RA through the transformer AH and to the tube $Ra$ through the transformer $Az$. Similarly, the tubes RB, $Rb$ are furnished with the output of the receiver B through the transformers BH, $Bz$. The principal difference between this circuit and the kallirotron circuit (Fig. 1) may be seen to be that alternating current is not supplied to one tube only, but to both tubes RA, RB, this current being conducted over the transformers LA, LB to the indicator of reception L. The arrangement is such that the receiver A acts on this indicator through the tube RA, and the receiver B acts thereon through the tube RB, according to which of the tubes RA, RB is caused to be operatively energized by the tubes Ra, Rb.

If the tube RA is operatively energized, then the receiver A will operate L. The battery 1 places such a bias on the tube RA that the working point of this tube is on the straight portion of its characteristic curve. This bias need not be negative, but may even have to be positive. The latter will be the case if a current flowing through the resistance 4 produces a bias that is too negative. An alternating potential GA (Fig. 3) from the receiver A will thus produce an alternating anode current AW in the tube RA, which, in turn, is impressed through LA upon L (Fig. 2). The continuous anode current $a1$ (Fig. 3) produces, by means of the resistance 2 (Fig. 2), a negative bias for the tube RB. This bias is, by means of the resistance 2, made so great as to produce conjointly with the bias caused by the battery 3 a grid bias that will displace the working point of the characteristic curve of tube RB to a position where the tube is rendered inoperative (Fig. 4). Thus, although the alternating potential supplied to the tube RB by the receiver B may be exactly the same as GA (Fig. 3), nevertheless the tube RB will not respond. It will thus be seen that by producing suitable working conditions the unstable condition above-mentioned, and consequently the resultant amplitude distortion are dispensed with. If now the alternating potential from the receiver B increases from the value GB to the value GB1 (Fig. 4) then a feeble anode current will arise in the tube RB. This current, if no special provisions were made, would bring about the same back coupling as described above with reference to the kallirotron (Fig. 1). The current in the tube RB would then increase and cause the tube RA to be put out of commission in a manner similar to that above described with regard to tube RB. The receiver B only would then be audible.

This type of construction, therefore, is not operable without further modifications. The reason for this is as follows. Suppose that the current GB rises to the value GB1 and that the current GA rises to the same value; then the tube RA, as soon as it became operative, would be subject to the same phenomenon as described with reference to the tube RB, i. e. the tube RA would be rendered inoperative, and the tube RB would then be cut in. A mutual back coupling would then occur which, because of the resultant unstable condition, could cause considerable distortion in the received signals.

To avoid this, the auxiliary tubes Ra, Rb have been introduced. These tubes operate as correction tubes, and in the embodiment shown in Fig. 2 they are connected in the manner of anode rectifiers. The input of rectifier tube Ra is connected through transformer Az to receiver A, while the input of rectifier tube Rb is connected through transformer Bz to receiver B. The space current paths of the two tubes Ra and Rb have connected in series therewith the respective plate batteries and a resistance W which is common to both. One terminal of resistance W is connected by conductor $l1$, with the positive terminal of battery 1 while the other terminal of resistance W is connected by conductor $l2$ to the positive terminal of battery 3 for a purpose as will be more fully hereinafter appear. Both tubes Ra and Rb operate through the resistance W. It will be seen that there is no potential at the ends of the resistance W, if the energies from the receivers A, B are equal to each other in intensity. In this case, either one or the other of the two main tubes is operative, according to which receiver has been switched in first. In order that only continuous voltage be impressed on the ends of this resistance, condensers C3, C4 are provided which form a short circuit, or by-pass, for the alternating current. If now the energy from receiver B increases, then the anode current in the tube Rb will increase and produce, at the upper end of the resistance W, a negative potential, and at the lower end thereof, a positive one. This difference of potential is impressed on the grids of the tubes RA, RB over conductors $l1$, $l2$. Thus, the grid potential of RA gets more negative, and that of RB more positive, as indicated in Figs. 3 and 4 by arrows $b1$, $b2$. The positive amplitude of the alternating grid potential GB2 likewise is increased slightly and the working point of the main tube is displaced by the action of the auxiliary tubes, as shown in Fig. 4, thus causing an anode current to arise in the tube RB. Hereby the reversal before described is effected, i. e. the tube RA becomes inoperative while the tube RB becomes operative, and tube RB effects the further transmission of the energy that arrives from the receiver B.

A good working condition here requires that the amplitudes of the alternating currents from the receivers A, B never rise to such intensities as that indicated at GB1, Fig. 4, that is, to intensities at which an effective anode current would arise in the inoperative tube, and thus render the arrangement unstable. It is only necessary here to note the case referred to before, viz., that in which the energies from both receivers happen to be of the same intensity. The automatic selecting of the receiver then is not caused by any increase in the intensity of the alternating current in the main tubes, but is effected essentially by the continuous voltage generated by the auxiliary tubes, this voltage acting to displace the working points of the characteristic curves of the main tubes to operating or non-operating points. The continuous voltage produced by the auxiliary tubes is advantageous also for the reason that in the associated circuits while the working point in one of the tubes is displaced in one direction (to stop its operation) the working point in the other tube is displaced in the other direction (to make it operate). The back coupling effect originally present in the main tubes is thus aided. In order that the operation of selecting the receivers may be free from the disturbing effects of the alternating currents in the main tubes, it may be so arranged that the auxiliary tubes Ra, Rb, as compared to the main tubes RA, RB, shall have a much higher amplifying power. This may be attained, for example, by using high transformation ratios in the transformers Az, Bz. The ratios of the input transformers AH, BH may be correspondingly low. It is also advantageous that the currents in the main tubes be modulated only to a slight degree, as these tubes cannot be kept from operating at intervals on a slightly curved portion of their characteristic curves. Further, it is advantageous to employ tubes having a characteristic curve with a strongly marked bend at its lower knee portion, in order that the amplication ratio may reach its maximum value immediately above this lower bend.

A disadvantage in the arrangement shown in Fig. 2 is that four anode batteries and three filament batteries are required in that circuit. In the arrangement embodied in Fig. 5, the anode batteries are combined to pairs so that only the two batteries, or potentiometer battery circuits S1, S2, are necessary from which circuits the grid biases may also be taken. The main tubes RA and RB with the auxiliary rectifier tubes Ra and Rb are connected to the respective receivers A and B and to the indicating device L in the same manner as in Fig. 2. The connection from the auxiliary to the main tubes differs, however, and heater type, instead of ordinary three-electrode tubes, are employed. Instead of the resistance W of Fig. 2 common to the plate circuits of the auxiliary tubes, there is provided in Fig. 5 a separate plate circuit control resistance for each auxiliary tube. Resistance W1 in the plate cathode circuit of tube Rb is in series with battery S1 and choke coil DR1 and controls the biasing potential of the grid of main tube RA. Similarly, resistance W2 in the plate cathode circuit of tube Ra is in series with battery S2 and choke coil DR2 and controls the grid biasing potential of the main tube RB. Only two sources of filament current are needed in Fig. 5. This is made possible by a different connection of the tubes Ra, Rb than the one disclosed in Fig. 2. Owing to this connection the auxiliary tubes operate together with the two resistances W1, W2. If the anode currents in these tubes are of the same intensity, then no difference of potential is produced on the conductors $l1$, $l2$ by them. If, however, the signal current from the receiver B, for instance, is greater than that from the receiver A, the continuous anode current in the tube Rb will be stronger than that in tube Ra, so that a difference of potential results in the resistance W1. The grid of tube RA is thus made more negative, and the reversal before mentioned is effected.

In order that the operation of the auxiliary tubes and main tubes will not interfere with each other in consequence of their having anode batteries in common circuits, choke coils Dr1, Dr2 are provided. Condensers C1, C2 (Fig. 5), also present in the arrangement shown in Fig. 2, are used to by-pass the alternating anode current AW (Fig. 3) of the operating tube and prevent it from causing a fluctuating grid potential in the inoperative tube. Such a fluctuating grid potential would otherwise arise due to the alternating current AW producing a drop of potential across the resistance 2 or 4, as the case may be. The condensers C1, C2 thus by-pass the alternating potentials from the resistances 2, 4, and thereby enable a continuous current, such as the anode current $a1$ (Fig. 3), to pass through the resistance 2. Secondly, the condensers C1, C2 will prevent the output of the main tubes from suddenly changing too quickly, as the resistances 2, 4 are located in the anode circuits.

The condensers C5, C6 and resistances W5, W6 serve to retard the automatic reversal of the main tubes and thereby avoid a sudden transition from one antenna, or main tube circuit, to the other with its accompanying distinct and audible change in the anode currents. By suitably designing this retarding arrangement, one is enabled to slow down the automatic reversal at will. This retarding arrangement presents the advantage that, in the event of a sudden or transient increase in the received energy of one antenna, the main tubes will not undergo the above described reversal because condenser C5 or C6 must first reverse its polarity.

With the forms of apparatus hereinbefore disclosed, the supposition is made that the current emanating from one receiver, such, for instance, as A, flows through the transformer AH and the transformer Az as well. But this is not necessary. Each one of the transformers may be fed from different portions of the same receiver. Thus, various circuits may be used to energize the auxiliary tubes.

This invention is not limited to the use of two receivers and one selecting device, but more receivers and several selecting devices may be adapted to operate with an indicator of reception, i. e. a teletyper or the like. For example, by means of one selecting device one of two receivers may be selected to act conjointly with a third receiver on a second selecting device which, in turn, may select the loudest receiver. This invention is adapted for use in telephony as well as in telegraphy. Further, the invention is not restricted to the described use of transformers. Choke or resistance couplings may also be used.

What is claimed is:

1. In a signaling system, the combination of two receivers, a pair of electron tubes each having a grid and an anode circuit, means for connecting the output of one receiver to one grid circuit and the output of the other receiver to the other grid circuit, an indicator of reception, means for connecting the indicator to the anode circuits of said tubes, a resistance connected in the grid circuit of each tube and also disposed in the anode circuit of the other tube, a pair of auxiliary electron tubes each having a grid and an anode circuit, means for connecting the grid circuit of each auxiliary tube to the output of a different one of said receivers, a resistance common to the anode circuits of the auxiliary tubes, means for causing a drop in potential across said common resistance, and connections from said common resistance to the grids of the first named tubes over which the drop in potential across said common resistance is impressed on said grids.

2. In a signaling system, the combination of two receivers, a pair of electron tubes each having a grid and an anode circuit, means for connecting the output of one receiver to one grid circuit and the output of the other receiver to the other grid circuit, an indicator of reception, means for connecting the indicator to the anode circuits of said tubes, a resistance connected in the grid circuit of each tube and also disposed in the anode circuit of the other tube, two auxiliary electron tubes each having a grid and an anode circuit and adapted to act as rectifiers, means for connecting the grid circuit of each auxiliary tube to a different one of said receivers, a resistance individual to the anode circuit of each auxiliary tube, means for causing a drop in potential across the last-named resistance, and a connection from each last-named resistance to the grid of one of the first mentioned electron tubes over which the drop in potential is impressed on said grids.

3. In a signaling system, the combination of a first and a second receiver each having an output circuit, a first and a second vacuum tube each having an input and an output circuit, means for coupling the output circuits of said first and second receiver to the input circuits of said first and second tubes respectively, two resistances each common to the input circuit of one of said tubes and to the output circuit of the other tube, an indicator of reception, means coupling said indicator to the output circuits of said tubes, an auxiliary pair of electron tubes each having a grid and an anode circuit, means for connecting the grid circuit of each auxiliary tube to the output circuit of a different one of said receivers, a resistance common to the anode circuits of both of the auxiliary tubes, means for causing a drop in potential across said common resistance and connections from said common resistance to the grids of the first-mentioned tubes over which the drop in potential is impressed thereon.

4. In combination, a plurality of spaced receivers each having an output circuit, a plurality of main vacuum tubes each having input and output circuits, means for coupling the output of each receiver individually to the input of a different one of said vacuum tubes, an indicator of reception, means coupling said indicator to the output circuit of each vacuum tube, and means responsive to received signals for maintaining operative only that vacuum tube associated with the receiver wherein signals having the greatest intensity are received, said last-mentioned means comprising a vacuum tube rectifier for each main vacuum tube coupled to the receiver therefor to receive energy therefrom, a resistance for the plate circuit of each main vacuum tube also connected in the grid circuit of another of the main vacuum tubes, a resistance connected in the plate circuit of each rectifier, and a connection for the last-mentioned resistance to the grid of one of the main vacuum tubes other than the one to which the connected rectifier resistance is individual.

HEINZ KALLMANN.